United States Patent [19]
Park

[11] Patent Number: 4,993,908
[45] Date of Patent: Feb. 19, 1991

[54] COMBINED TAILGATE AND LOADER ASSEMBLY FOR A DUMP TRUCK

[76] Inventor: Robert W. Park, 1289 E. David Rd., Dayton, Ohio 45429

[21] Appl. No.: 352,349

[22] Filed: May 15, 1989

[51] Int. Cl.$^5$ .................... B60P 1/46; B62D 33/033
[52] U.S. Cl. .................... 414/472; 414/545; 296/51; 296/59; 298/23 MO; 298/23 S
[58] Field of Search .................... 296/51, 59-61; 414/545; 298/23 A, 23 B, 23 M, 23 MD, 23 S

[56] References Cited

U.S. PATENT DOCUMENTS

| Re. 31,157 | 2/1983 | Perkins | 414/545 |
|---|---|---|---|
| 2,706,565 | 4/1955 | Krasno | 414/545 |
| 2,850,187 | 9/1958 | Roberts | 414/557 |
| 3,024,926 | 3/1962 | Nolden | 414/545 |
| 3,174,634 | 3/1965 | Peck | 414/545 X |
| 4,007,844 | 2/1977 | Perkins | 414/545 |
| 4,198,818 | 4/1980 | Perkins | 414/545 |
| 4,563,121 | 1/1986 | Drews | 414/545 |

FOREIGN PATENT DOCUMENTS

| 201204 | 3/1955 | Australia | 296/60 |
|---|---|---|---|

OTHER PUBLICATIONS

Del America Corporation Brochure, 1986 "Dump Thru Tailgate".

*Primary Examiner*—Dennis H. Pedder
*Attorney, Agent, or Firm*—Jacox & Meckstroth

[57] ABSTRACT

A dump truck body has a bed and side walls defining a rear opening which is closed by a tailgate and loader unit removably attached to adaptor brackets inserted into the side walls. The unit includes a U-shaped frame supporting extendable tracks which carry a vertical tailgate supported for pivotal movement to form a horizontal platform. The frame also encloses two pairs of oppositely directed hydraulic cylinders which move the tracks, and a cam mechanism is shifted into alignment to pivot the tailgate between horizontal and vertical positions in response to movement of the tracks. The entire unit is pivotally supported by the adaptor brackets to pivot from the truck body when the body is inclined for dumping.

25 Claims, 2 Drawing Sheets

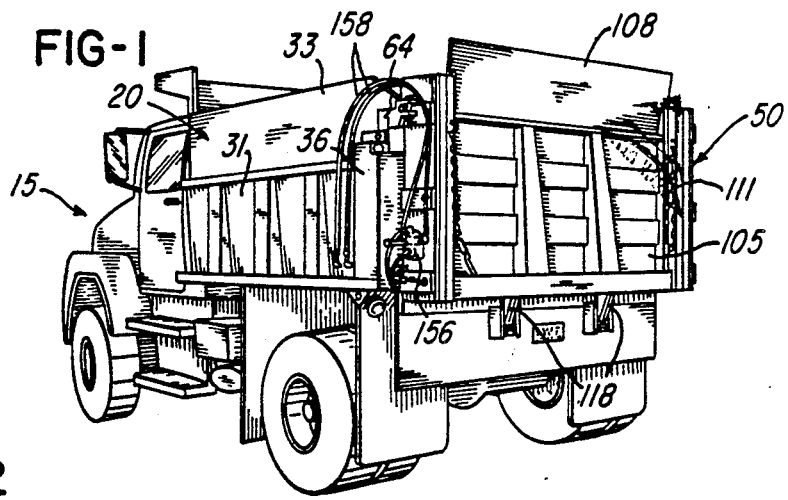
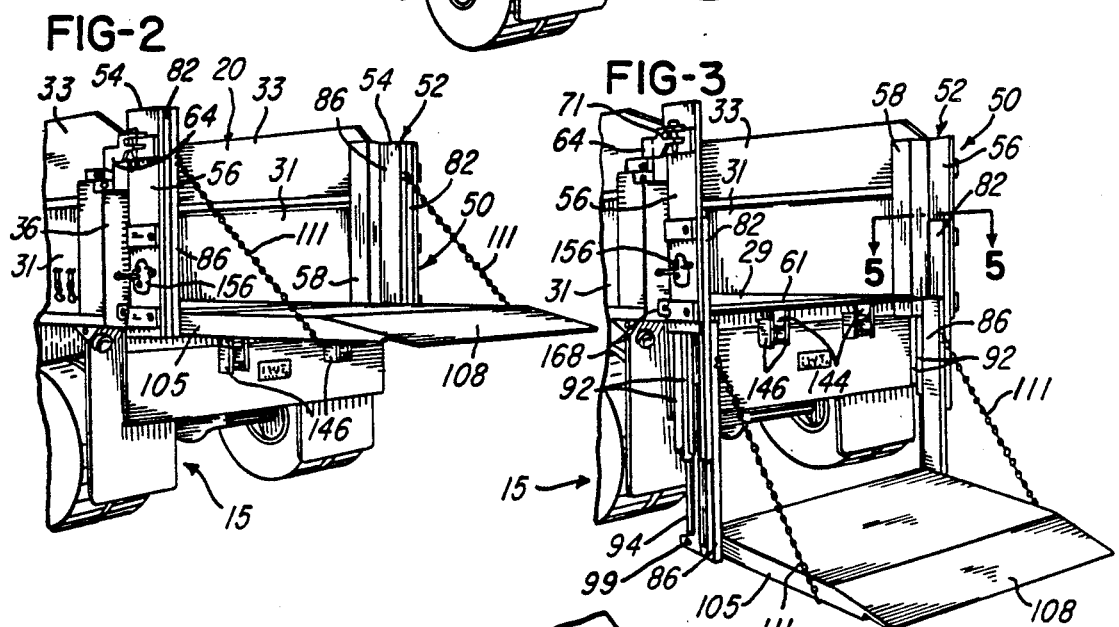
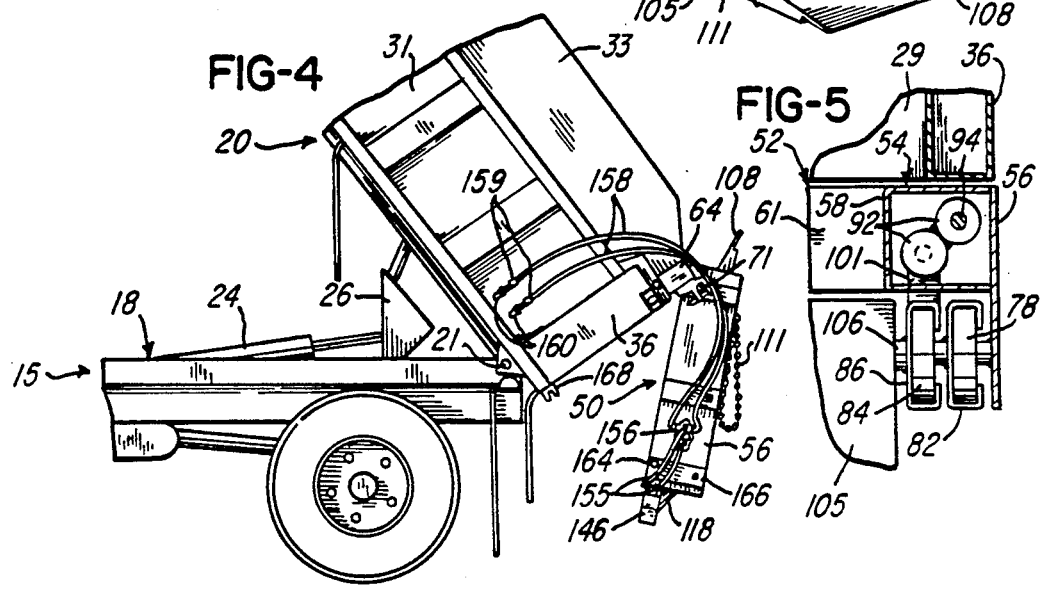

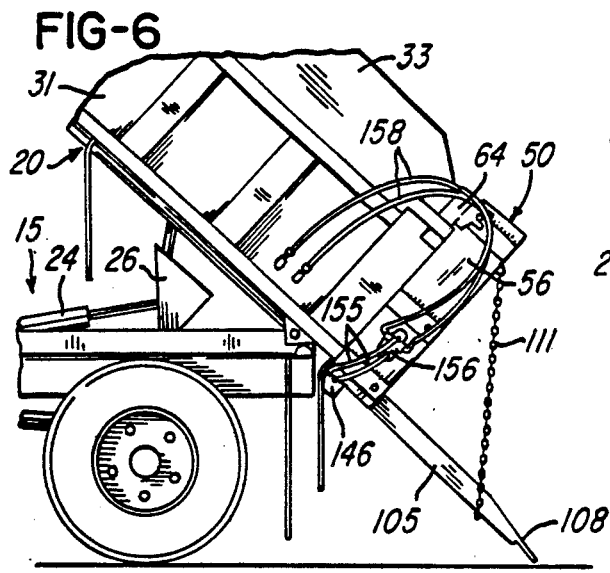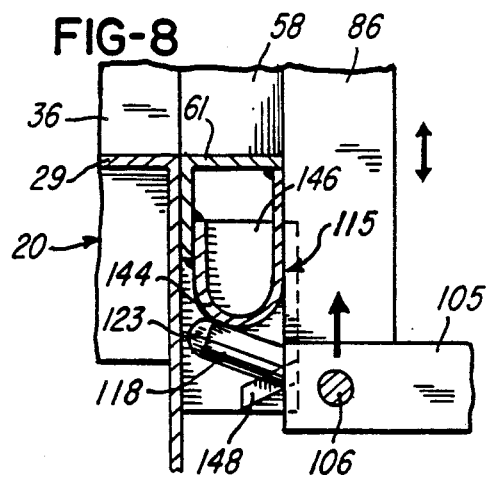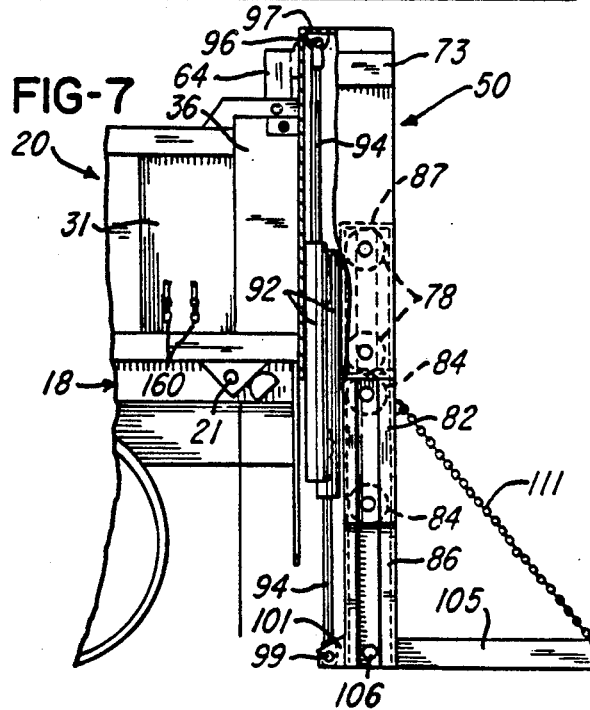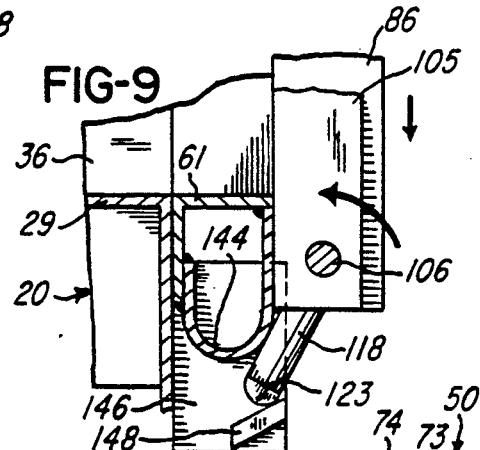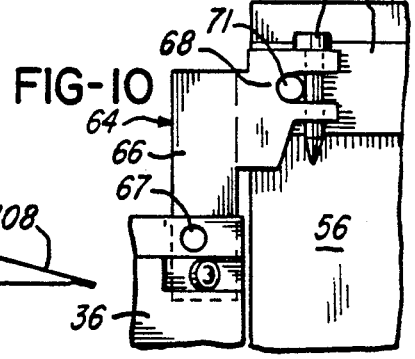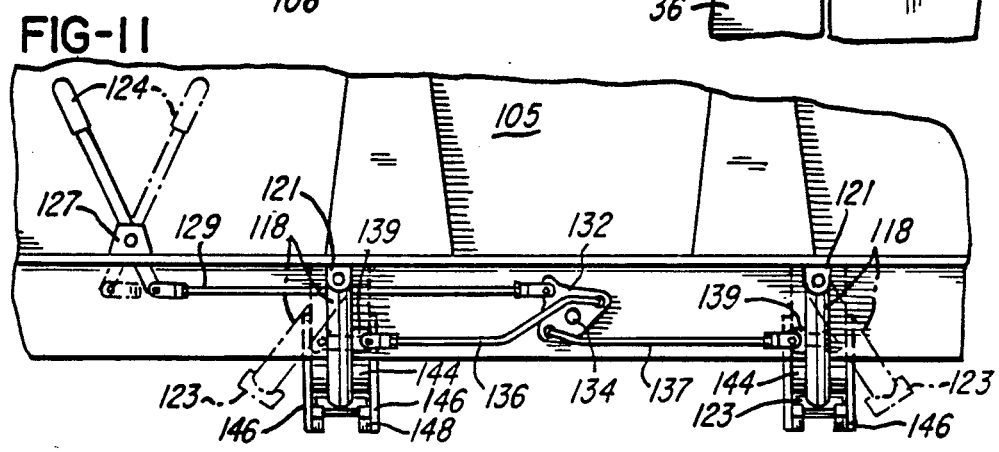

COMBINED TAILGATE AND LOADER ASSEMBLY FOR A DUMP TRUCK

BACKGROUND OF THE INVENTION

In the art of tailgate and loader systems for trucks, for example, such as disclosed in U.S. Pat. Nos. 2,706,565, 2,850,187 and 4,563,121, there have been systems designed for use on dump trucks having a pivotally supported body including a flat bed nd parallel side walls. One type of such tailgate loader system is marketed by Del America Corporation and includes a pair of vertical extendable tracks which are mounted on the rear surfaces of the body side walls. The tracks carry a U-shaped frame which supports a pivotal tailgate, and the tailgate may be pivoted on a top axis for dumping contents from the inclined body. The frame and tailgate may also be pivoted on a bottom axis to a horizontal position to form a platform which is raised and lowered by flexible chains extending around driven sprockets. Another general type of tailgate loader which has been used on dump trucks is disclosed in above mentioned U.S. Pat. No. 2,850,187. In this type of loader, the elevating mechanism is mounted on the truck chassis under the rear end portion of the dumping body.

It has been determined that there is a need for a tailgate and loader assembly which can be conveniently and quickly installed on a dump truck of the type which is commonly used by municipalities and state highway departments. This type of dump truck has a large capacity dumping body which is pivoted on an axis located close to the rear of the body directly behind the rear wheels of the truck. These dump trucks are commonly used for plowing snow and spreading salt on the roads and are usually equipped with a hydraulic power supply which is used not only to pivot the body but also to operate a rotary auger or spreader for distributing the salt while the body is inclined to a dumping position.

Frequently, it is desirable to use a municipal-type dump truck for transporting heavy articles which are discarded such as large appliances, old furniture and other large junk items or articles which are too large or bulky or rigid to be compacted in a refuse collection vehicle. When the truck is used for this purpose, it has been found desirable to remove the conventional tailgate and quickly replace it with a combined tailgate and loader unit. After then need for the tailgate and loader unit has ceased, it is desirable to remove the tailgate and loader unit quickly and replace it with the conventional tailgate so that the truck may be used for spreading salt and other purposes. A tailgate and loader unit which can be quickly and easily attached to and removed from a municipal-type dump truck is also highly desirable so that the unit may be used with any one of a series of dump trucks, whichever might be more readily available.

SUMMARY OF THE INVENTION

The present invention is directed to an improved tailgate and loader assembly or unit which provides all of the desirable features mentioned above, especially a unit which may be quickly and conveniently attached to and removed from a municipal-type dump truck. The tailgate and loader unit of the invention is also compact in its retracted and collapsed position so that id does not project below the bed of the dump truck and functions as a tailgate by swinging to an open position for dumping material from the inclined body.

In accordance with the invention, a tailgate and loader assembly or unit is constructed as a separate module which is pivotally connected at its top to the side walls of the dump body by a pair of inverted L-shaped adaptor brackets. The brackets are removably connected to the side walls of the body by cross pins which normally support the conventional tailgate for pivoting, and the brackets are removably connected to the loader unit by a pair of pivot trunions which are retained within yoke portions of the brackets by drop pins. The trunions provide the entire support for the unit.

The tailgate and loader unit also includes a U-shaped frame having a pair of vertical side frame members rigidly connected by a cross frame member located flush with the truck bed. The vertical frame members support a set of vertically extendable C-shaped tracks which are moved vertically by two pairs of hydraulic cylinders with each pair having piston rods extending in opposite directions and normally enclosed within a tubular housing forming part of the vertical frame members. The lower end portions of the tracks pivotally support a tailgate which pivots to a horizontal platform position. The tailgate is cammed between its horizontal and vertical positions by cam members mounted on the cross frame member and engaged by retractable cam followers mounted on the tailgate. The entire loader and tailgate unit may be released for swinging to an open position on the axis of the trunions when the dump truck body is elevated for dumping material from the body. The hydraulic cylinders are operated by a control valve mounted on a side frame member, and flexible hydraulic hoses and releasable couplings connect the valve to one pair of the hydraulic supply fittings normally projecting from both side walls of the dump body.

Other features and advantages of the invention will be apparent from the following description, the accompanying drawings and the appended claims.

BRIEF DESCRIPTION OF THE DRAWINGS

FIG. 1 is a perspective view of a municipal-type dump truck having its conventional tailgate replaced by a modular tailgate and loader unit constructed in accordance with the invention;

FIG. 2 is a perspective view of the tailgate and loader unit shown in FIG. 1 and with the tailgate in a horizontal elevated position forming a platform;

FIG. 3 is a perspective view of the unit and showing it extended with the tailgate/platform lowered to the road surface;

FIG. 4 is a fragmentary side view of the dump truck shown in FIG. 1 and illustrating the tailgate and loader unit pivoted to an open position with the truck body in a dumping position;

FIG. 5 is a fragmentary section taken generally on the line 5—5 of FIG. 3;

FIG. 6 is a view similar to FIG. 4 and illustrating the unit with the tailgate lowered to a platform position;

FIG. 7 is a fragmentary side view of the truck and loader unit shown in FIG. 3 and with a portion of the side frame member broken away;

FIGS. 8 & 9 are fragmentary sections illustrating the cam actuating mechanism for moving the tailgate between its horizontal and vertical positions;

FIG. 10 is a fragmentary side view showing one of the removable adaptor brackets which connect the tailgate and loader unit to the side walls of the truck body; and FIG. 11 is a fragmentary rear elevational view of the tailgate with a cover plate removed to show the cam actuating mechanism.

DESCRIPTION OF THE PREFERRED EMBODIMENT

FIG. 1 illustrates a typical dump truck 15 which is commonly used by municipalities and state highway departments and which includes a wheel-supported chassis 18 (FIG. 4) supporting a dump body 20 for tilting or pivotal movement on an axis 21 located close to the rearward end of the body 20. A hydraulic cylinder 24 (FIG. 4) and mechanical linkage 26 operate to move the body 20 between its horizontal position (FIG. 1) and a dumping position (FIG. 4). The dump body 20 includes a flat bed 29 (FIG. 3) and parallel side walls 31 which are provided by removable side boards or extensions 33. The rearward end portions of the side walls 31 are formed by tubular metal corner posts 36 which have a rectangular cross-section and cooperate with the bed 29 to define a rear opening for the body 20.

In accordance with the present invention, a modular tailgate and loader assembly or unit 50 is mounted on the rearward end of the dump body 20 adjacent the rear corner posts 36. The unit 50 includes a rigid U-shaped frame 52 fabricated of steel and having a pair of vertical frame members 54. Each of the frame members 54 includes an outer flat steel plate 56 (FIG. 5) and a square tubular housing 58, and the housings 58 are rigidly connected by a cross frame member 61 having a right angle shape, as shown if FIGS. 8 and 9.

Referring to FIG. 10, a pair of inverted L-shaped adaptor brackets 64 have vertical tubular portions 66 which extend downwardly into mating sockets formed within the corner post 36 of the body 20, and retractable cross pins 67 secure the adaptor brackets to the side walls 31 of the body 20. Each of the brackets 64 also includes a yoke portion 68 which projects rearwardly of the corner post 36 and receive a pair of trunions or pivot pins 71 rigidly connected to the vertical frame plates 56 by reinforcing plates 73. Retractable drop-in or lock pins 74 retain the pivot pins 71 within the yoke portions 68, and the pins 71 provide for pivotal or swinging movement of the unit 50. When the unit 50 is supported by the adaptor brackets 64, as shown in FIG. 10, the upper flange of the cross frame member 61 extends coplanner or flush with the bed 29 of the body 20, as shown in FIG. 8.

Referring to FIGS. 5 and 7, each of the plates 56 of the vertical frame members 54 supports a pair of vertically spaced rollers 78 which, in turn, support a C-shaped channel-like track 82 for vertical movement. Another pair of vertically spaced rollers 84 are mounted on each track 82 and supports another C-shaped track 86 for vertical movement relative to the track 82. The tracks 82 and 86 are extendable from retracted positions (FIG. 2) to downward extended positions (FIG. 3 and 7). Each of the tracks 82 and 86 has a top cover plate 87 (FIG. 7) to confine the rollers 78 and 84 within the tracks.

The vertical movement of the tracks 82 and 86 is produced by a pair of hydraulic cylinders 92 which are enclosed within each of the tubular housings 58 of the vertical frame members 54 when the tracks 82 and 86 are in their retracted positions. As shown in FIG. 7, each of the forward cylinders 92 has a piston rod 94 which projects upwardly and is connected by a pin 96 to a yoke on a top cover plate 97 for the corresponding tubular housing 58. Each of the rearward hydraulic cylinders 92 has a downwardly extendable piston rod 94 (FIG. 7) which is connected by a pin 99 to a U-shaped bracket 101 projecting forwardly from the lower end portion of the corresponding track 86. The cylinders 92 are double-acting cylinders and are connected by hydraulic lines to operate simultaneously or in unison.

The modular assembly or unit 50 also includes a tailgate 105 which is also fabricated from steel and is pivotally connected to the lower end portions of the tracks 86 by trunions or pivot pins 106. The tailgate 105 has a tapered leading ramp portions 108 (FIG. 3) which projects upwardly above the frame 52 when the tailgate 105 is in its vertical position as shown in FIG. 1. When the tailgate 105 is pivoted to a horizontal position (FIGS. 2 and 3) to form a platform, the tailgate is also supported by a pair of flexible chains 111 extending from the upper portions of the tracks 86. As shown in FIGS. 2 and 3, when the tailgate 105 is in its horizontal platform position, it is movable between its lowermost position (FIG. 3) resting on the road surface and its elevated position (FIG. 2) where the top surface of the tailgate is flush with the top surface of the bed 29.

Referring to FIGS. 8, 9 and 11, a cam mechanism 115 provides for moving the tailgate 105 between its vertical and horizontal positions in response to vertical movement of the tracks 86 which support the tailgate. When the tailgate 105 is in its vertical position, the tailgate is locked to the frame 52 by a heavy duty pivotal hasp (not shown) and a rectractable pin. The cam mechanism 115 includes a pair of cam followers or rods 118 (FIG. 11) which are pivotally supported by corresponding inverted U-shaped brackets 121 secured to the tailgate and are movable between active positions where the axes of the rods 118 are in vertical planes and retracted inactive positions where the rods 118 are inclined outwardly. Each of the rods 118 has a cross pin 123 forming its lower end portion, and movement of the rods 118 between their active and inactive positions is produced by pivoting of a lever 124 which is pivotally supported between plates 127 (FIG. 11) mounted on the tailgate 105. The lower end portion of the lever 124 is connected by a metal rod or link 129 to a plate 132 rotatable on a bolt 134. A set of formed metal rods or links 136 and 137 connect ecentric holes within the plate 132 to corresponding ears 139 projecting laterally from the rods 118.

Referring to FIG. 9, when the tailgate 105 is in its vertical position, the rods 118 are aligned with corresponding U-shaped cam members 144 secured or welded to the cross member 61 of the frame 52. A pair of side plates 146 project downwardly from each cam member 144 and support a pair of opposing inclined cam blocks 148 located under the end portions of the cross pins 123 welded to the rods 118.

When it is desired to lower the tailgate 105, the tracks 86 are shifted downwardly by actuation of the hydraulic cylinders 92, and the cam blocks 148 pivot the tailgate 105 outwardly in a clockwise direction (FIG. 9) until the weight of the tailgate urges the rods 118 against the cam members 144. As the tracks 86 continue to move downwardly, the tailgate 105 pivots to a horizontal position (FIG. 8). The rods 118 and cross pins 123 are then free to move downwardly between the plates 146 so that the horizontal tailgate 105 may be moved to its lowermost position resting on the road surface as shown in FIG. 3. When it is desired to raise the tailgate 105 to a position flush with the bed 29, as shown in FIG. 2, the rods 118 are pivoted to their retracted inactive positions by moving the lever 124, as shown by the dotted lines in FIG. 11. In these positions, the rods 118 do not engage the cam members 144 when the tailgate 105 is raised to its uppermost position flush with the bed 29.

When it is desired to pivot the tailgate 105 from its horizontal platform position to its vertical position between the tracks 86, the cam follower rods 118 are positioned in alignment with the cam members 144 while the platform 105 is located below the side plates 146 on the cam members 144. As the tracks 86 and tailgate are elevated, the rods 118 engage the cams 144 which pivot the tailgate 105 to its vertical position, as shown in FIG. 9. While the tailgate 105 is in its vertical position, the side plates 146 prevent the rods 118 from being pivoted to their inactive or retracted positions until the tailgate 105 is lowered to its horizontal position and the rods 118 have moved below the side plates 146. As the result, the tailgate 105 cannot be moved between its horizontal and vertical positions without vertical movement with the tracks 86.

As shown in FIGS. 1, 4 and 6, the two pairs of double-acting hydraulic cylinders 92 are interconnected by hydraulic lines 155 to a manual control valve 156 mounted on one of the vertical frame plates 56. A pair of flexible hydraulic lines or hoses 158 and quick connect couplings 159 connect the control valve 156 to a pair of hydraulic supply lines and fittings 160 which are normally installed on the dump body 20 of the truck 15 for operating a hydraulically driven salt spreader. Usually, a pair of fittings 160 is provided on each side wall of the body 20 so that the salt spreader may be selectively operated from either side. The control valve 156 and hydraulic hoses 155 and 158 may be installed on either side of the dump body 20 and loader unit 50.

As also shown in FIG. 4, a pin 164 projects outwardly from a reinforcing plate 166 mounted on the lower end portion of each frame plate 56, and the pins are normally received within U-shaped yoke members 168 mounted on the rear corners of the bed 29. A swing-away latch (not shown) retains the pins 164 when the body 20 is in a horizontal position. When it is desired to dump a load of material from the body 20, the latch is released so that the tailgate and loader unit 50 is free to pivot away from the rear corner posts 36 of the body 20 to an open position, as shown in FIG. 4.

From the drawings and the above description, it is apparent that a tailgate and loader unit constructed in accordance with the present invention, provides desirable features and advantages. For example, as one desirable feature, the separate unit 50 may be quickly and easily installed on a municipal-type dump truck 15 simply by removing the conventional tailgate, sliding in the adaptor brackets 64 and connecting the trunions 71 to the adaptor bracket portions 68 while the unit 50 is being elevated with the aid of a winch or other device. The hoses 158 are then connected by the quick couplings 159 to the fittings 160, after which the unit 50 is ready for use as either a tailgate (FIG. 4) or as a loading and unloading device, as shown in FIGS. 2, 3 and 6. When it is desired to remove the unit 50 and replace it with the conventional tailgate for the dump body, the above steps are simply reversed while the unit 50 is being supported. Since the frame members 54 and the tracks 82 and 86 have the same length and the unit 50 does not project below the bed 29 when the unit is retracted, the unit does not interfere with use of the dump truck when dumping material from the body 20, as shown in FIG. 4, or when the tailgate is used as an extension of the elevated bed 29, as shown in FIG. 6. In addition, the cam mechanism 115 provides for automatically pivoting the tailgate 105 between its horizontal and vertical positions and assures that the tailgate 105 cannot free fall from its vertical position to its horizontal position. Furthermore, the adaptor brackets 64 provide for using different brackets according to the height of the body side walls 31 and the size of the socket openings which receive the bracket portions 66.

While the form of tailgate and loader unit herein described constitutes a preferred embodiment of the invention, it is to be understood that the invention is not limited to this precise form, and that changes may be made therein without departing from the scope and spirit of the invention as defined in the appended claims.

The invention having thus been described, the following is claimed:

1. A combined tailgate and loader unit adapted for quick attachment to a dump truck having a pivotally supported body including a bed and parallel spaced side walls defining a rear opening, said unit comprising a frame including a pair of parallel spaced vertical frame members having upper end portions and lower end portions, a horizontal cross frame member rigidly connecting said lower end portions of said vertical frame members, means for removably connecting said upper end portions of said vertical frame members to the side walls of said body and for supporting said frame for pivotal movement on a horizontal axis from a first position with said cross frame member disposed generally adjacent the bed, a set of elongated extendable tracks having lower end portions and supported by said vertical frame members for longitudinal vertical movement between upper retracted positions and lower extended positions, a generally rectangular tailgate having a longitudinal edge portion supported by said lower end portions of said tracks for pivotal movement of said tailgate between a vertical position and a horizontal position forming a platform, power operated means adjacent said vertical frame members for moving said tracks between said retracted and extended positions to move said tailgate in said horizontal position between a lower position adjacent a road surface and an elevated position generally flush with said bed, and said unit including said frame, said tracks and said tailgate being pivotal on said horizontal axis between said first position closing the opening of the body and a second angular position uncovering the opening when the body is pivoted to an inclined dumping position.

2. A unit as defined in claim 1 wherein said means supporting said frame for pivotal movement include a set of adaptor brackets, means for connecting said adaptor brackets to the side walls of the body adjacent the rear opening and pivot members connecting said upper end portions of said vertical frame members to said adaptor brackets.

3. A unit as defined in claim 2 and including means for releasably connecting said vertical frame members to said adaptor brackets for accommodating adaptor brackets of different sizes.

4. A unit as defined in claim 2 wherein each said adaptor bracket includes a vertical portion adapted to be removably connected to the corresponding wall of the body, and rearwardly projecting portion having means for supporting the corresponding said pivot member with said horizontal axis disposed rearwardly to the body.

5. A unit as defined in claim 1 and including actuating means responsive to movement of said tracks to said retraced position for pivoting said tailgate between said horizontal and vertical positions, and means for moving said actuating means to an inactive position to provide for moving said tailgate to said elevated position substantially flush with the bed of the body.

6. A unit as defined in claim 5 wherein said actuating means include at least one cam member mounted on said cross frame member, a cam follower member mounted on said tailgate, and said cam follower member being movable to an inactive position out of alignment with said cam member to provide said inactive position.

7. A unit as defined in claim 5 and including means for preventing movement of said actuating means to said inactive position when said tailgate is in said vertical position.

8. A unit as defined in claim 1 wherein said cross frame member has an upper surface generally flush with a top surface of the bed when said unit is in said first position.

9. A unit as defined in claim 1 wherein said set of extendable tracks comprise first and second C-shaped tracks for each of said vertical frame members, a set of rollers mounted on each said vertical frame member and supporting the corresponding said first track, and a set of rollers mounted on each said first track and supporting the corresponding said second track.

10. A unit as defined in claim 1 and including means for pivoting said tailgate from said vertical position toward said horizontal position in response to downward movement of said tracks from said retracted position.

11. A unit as defined in claim 10 wherein said means for pivoting said tailgate comprise at least one cam member mounted on said cross frame member, and a cam follower member mounted on said tailgate and position to engage said cam member.

12. A unit as defined in claim 1 and including a hydraulic control valve mounted on one of said vertical frame members, a set of flexible hydraulic hoses for connecting said valve to a pressurized hydraulic supply on the dump truck, and said hoses being positioned to provide for said pivotal movement of said unit.

13. A unit as defined in claim 1 wherein said tailgate includes an outer inclined ramp portion, and said ramp portion projects above said vertical frame members when said tailgate is in said vertical position and said tracks are in said retracted positions.

14. A combined tailgate and loader unit adapted for quick attachment to a dump truck having a pivotally supported body including a bed and parallel spaced side walls defining a rear opening, said unit comprising a frame including a pair of parallel spaced vertical frame members having upper end portions and lower end portions, a horizontal cross frame member rigidly connecting said lower end portions of said vertical frame members, means for removably connecting said upper end portions of said vertical frame members to the side walls of said body and for supporting said frame for pivotal movement on a horizontal axis from a first position with said cross frame member disposed generally adjacent the bed, a set of elongated extendable tracks having lower end portions and supported by said vertical frame members for longitudinal vertical movement between upper retracted positions and lower extended positions, a generally rectangular tailgate having a longitudinal edge portion supported by said lower end portions of said tracks for pivotal movement of said tailgate between a vertical position and a horizontal position forming a platform, means including a set of hydraulic cylinders disposed adjacent said vertical frame members for moving said tracks between said retracted and extended positions to move said tailgate in said horizontal position between a lower position adjacent a road surface and an elevated position generally flush with said bed, and said unit including said frame, said tracks and said tailgate being pivotal on said horizontal axis between said first position closing the opening of the body and a second angular position uncovering the opening when the body is pivoted to an inclined dumping position.

15. A unit as defined in claim 14 wherein each of said tracks and each of said vertical frame members have generally the same length, said vertical frame members including corresponding vertical tubes disposed forwardly of said tracks and enclosing said hydraulic cylinders, and said cross frame member rigidly connects said vertical tubes forwardly of said tracks.

16. A unit as defined in claim 14 wherein said hydraulic cylinder means comprise a pair of rigidly connected cylinders adjacent each of said vertical frame members, one of said cylinders of each pair having an upwardly extending piston rod connected to said upper end portion of the corresponding said vertical frame member, and the other said cylinder of said pair having a downwardly extending piston rod connected to said lower end portion of said tracks.

17. A unit as defined in claim 16 wherein each of said vertical frame members includes a vertical tubular housing enclosing each said pair of cylinders when said tracks are in said retracted positions.

18. A combined tailgate and loader unit adapted for quick attachment to a dump truck having a pivotally supported body including a bed and parallel spaced side walls defining a rear opening, said unit comprising a frame including a pair of parallel spaced vertical frame members having upper end portions and lower end portions, a horizontal cross frame member rigidly connecting said lower end portions of said vertical frame members, means for connecting said upper end portions of said vertical frame members to the side walls of said body and for supporting said frame for pivotal movement on a horizontal axis from a first position with said cross frame member disposed generally adjacent the bed, a set of elongated extendable tracks having lower end portions and supported by said vertical frame members for longitudinal vertical movement between upper retracted positions and lowered extended positions, a generally rectangular tailgate having a longitudinal edge portion supported by said lower end portions of said tracks for pivotal movement of said tailgate between a vertical position and a horizontal position forming platform, power operated means for moving said tracks between said retracted and extended positions to move said tailgate in said horizontal position between a lower position adjacent a road surface and an elevated position generally flush with the bed, said unit including said frame, said tracks and said tailgate being pivotal on said horizontal axis between said first position closing the opening of the body and a second angular position uncovering the opening when the body is pivoted to an inclined dumping position, actuator means for pivoting said tailgate between said horizontal and vertical positions, and means for deactivating said actuator means.

19. A unit as defined in claim 18 wherein said actuator include at least one cam member mounted on said cross frame member, a cam follower member mounted on said tailgate, and said cam follower member being movable by said deactivating means to an inactive position out of alignment with said cam member.

20. A unit as defined in claim 19 and including means for preventing movement of said cam follower member when said tailgate is in said vertical position.

21. A unit as defined in claim 18 wherein said power operated means comprise a pair of rigidly connected hydraulic cylinders adjacent each of said vertical frame members, one of said cylinders of each pair having an upwardly extending piston rod connected to said upper end portion of the corresponding said vertical frame member, and the other said cylinder of said pair having a downwardly extending piston rod connected to said lower end portion of said tracks.

22. A unit as defined in clam 21 wherein each of said vertical frame members includes a vertical tubular housing enclosing each said pair of cylinders when said tracks are in said retracted positions.

23. A unit as defined in claim 18 wherein said set of extendable tracks comprise first and second C-shaped tracks for each of said vertical frame members, a set of rollers mounted on each said vertical frame member and supporting the corresponding said first track, a set of rollers mounted on each said first track and supporting the corresponding said second track, and said first and second tracks and said vertical frame members having generally the same length.

24. A unit as defined in claim 18 wherein said actuator means is effective to pivot said tailgate from said vertical position toward said horizontal position in response to downward movement of said tracks from said retracted position.

25. A unit as defined in claim 18 wherein each of said tracks and each of said vertical frame members have generally the same length, said vertical frame members including corresponding vertical tubes disposed forwardly of said tracks, and said cross frame member rigidly connects said vertical tubes forwardly of said tracks.

* * * * *